United States Patent [19]
Furuta et al.

[11] Patent Number: 5,624,984
[45] Date of Patent: Apr. 29, 1997

[54] LIQUID CRYSTAL POLYESTER RESIN COMPOSITIONS AND PROCESS FOR PRODUCING THE SAME

[75] Inventors: Motonobu Furuta, Chiba; Takanari Yamaguchi, Ibaraki, both of Japan

[73] Assignee: Sumitomo Chemical Company Limited, Osaka, Japan

[21] Appl. No.: 325,239

[22] PCT Filed: Feb. 24, 1994

[86] PCT No.: PCT/JP94/00299

§ 371 Date: Jan. 3, 1995

§ 102(e) Date: Jan. 3, 1995

[87] PCT Pub. No.: WO94/19407

PCT Pub. Date: Sep. 1, 1994

[30] Foreign Application Priority Data

Feb. 26, 1993 [JP] Japan .................................. 5-038314
Oct. 13, 1993 [JP] Japan .................................. 5-280511

[51] Int. Cl.$^6$ ............................................. C08K 5/17
[52] U.S. Cl. ........................... 524/243; 524/246; 524/252
[58] Field of Search ................................... 524/243, 246, 524/252

[56] References Cited

U.S. PATENT DOCUMENTS

| | | | |
|---|---|---|---|
| 4,189,549 | 2/1980 | Matsunaga et al. | 525/439 |
| 4,460,735 | 7/1984 | Froix | 524/537 |
| 4,728,698 | 3/1988 | Isayev et al. | 525/439 |
| 4,889,886 | 12/1989 | Wada et al. | 524/449 |
| 5,262,473 | 11/1993 | Cottis et al. | 524/537 |
| 5,264,477 | 11/1993 | Wissbrun et al. | 524/396 |
| 5,409,979 | 4/1995 | Nakai | 524/306 |

FOREIGN PATENT DOCUMENTS

| | | | |
|---|---|---|---|
| 0030417 | 11/1980 | European Pat. Off. | B29F 33/00 |
| 0265791 | 5/1988 | European Pat. Off. | |
| 4035848 | 4/1992 | Germany | |

*Primary Examiner*—Kriellion S. Morgan
*Attorney, Agent, or Firm*—Sughrue, Mion, Zinn, Macpeak & Seas

[57] ABSTRACT

There are provided inexpensive liquid crystal polyester resin compositions excellent in thermal resistance, molding processability and mechanical properties, particularly excellent in weld strength, impact resistance and thin wall properties, which can be utilized for molded articles, etc. by injection molding or extrusion molding, and processes for producing the same.

(1) A liquid crystal polyester resin composition comprising 100 parts by weight of a composition comprising (A) 1 to 99% by weight of a liquid crystal polyester and (B) 99 to 1% by weight of an aromatic polycarbonate, and (C) 0.0001 to 3 parts by weight of a diamine; and a process for producing the above-mentioned liquid crystal resin composition comprising melt kneading a liquid crystal polyester with an aromatic polycarbonate and a diamine.

(2) A liquid crystal polyester resin composition comprising (A) a liquid crystal polyester, (B) an aromatic polycarbonate, (C) a diamine and (D) surface-untreated glass fibers having a number average fiber diameter of 5 to 25 μm, a number average fiber length of 30 to 1,000 μm, and a number average fiber length/number average fiber diameter ratio of 2 to 150, wherein the contents of components (A) and (B) are 35 to 99% by weight and 65 to 1% by weight, respectively, based on the total amount of components (A) and (B), and the contents of components (C) and (D) are 0.0001 to 3 parts by weight and 1 to 100 parts by weight, respectively, based on 100 parts by weight of the total amount of components (A) and (B).

9 Claims, 3 Drawing Sheets

LIQUID CRYSTAL POLYESTER RESIN COMPOSITIONS AND PROCESS FOR PRODUCING THE SAME

TECHNICAL FIELD

The present invention relates to novel liquid crystal polyester resin compositions excellent in thermal resistance, molding processability and mechanical properties, and particularly excellent in weld strength, impact resistance, and thin wall properties, which can be utilized as molded articles by injection molding or extrusion molding.

BACKGROUND ART

Different from crystalline polyesters such as polyethylene terephthalate and polybutylene terephthalate, liquid crystal polyesters do not entangle in their molecules even in the molten state due to their rigidity to form polydomains in the liquid crystal state, and show the behavior that the molecular chains are significantly orientated in a flow direction by low shear. They are generally referred to as melt type liquid crystal (thermotropic liquid crystal) polymers. The liquid crystal polyesters have very excellent melt flowability due to this characteristic behavior, and thin-walled molded articles having a thickness of about 0.2 to 0.5 mm can be easily obtained. Moreover, the molded articles offer the advantages of high strength and high stiffness. However, they also have the disadvantages of very large anisotropy and significantly low weld strength. Furthermore, high molding temperatures thereof have limited their use. The liquid crystal polyesters also have the problem that they are generally expensive.

Inexpensive liquid crystal polyester resin compositions retaining the excellent thermal resistance and mechanical properties of the crystal polyesters and having improved in weld strength of their molded articles have been strongly demanded from the market.

A resin composition comprising a melt-processable polymer and an anisotropic melt forming polymer is disclosed in JP-A-56-115357 (the term "JP-A" as used herein means an "unexamined published Japanese patent application"), wherein it is described that addition of the anisotropic melt forming polymer to the melt-processable polymer results in an improvement in processability of the melt-processable polymer. For example, addition of a liquid crystal polyester to a polyphenylene ether/polystyrene mixture is exemplified therein.

For the purpose of improving solder heat resistance, resin compositions in which liquid crystal polyesters are blended with various kinds of polyarylene oxides are described in JP-A-2-97555.

However, in general, a composition formed by blending a liquid crystal polyester having a higher molding temperature with an amorphous polymer such as polyphenylene ether having a lower molding temperature than that of the liquid crystal polyester has the disadvantage of producing a molded article with poor appearance due to thermal decomposition of the blended resin on molding processing at high temperatures, although the melt processability of the composition is improved. Further, the composition has the problem that it insufficient in thermal resistance, mechanical properties, and impact resistance.

Compositions comprising liquid crystal polyesters and aromatic polycarbonates are disclosed in JP-A-57-40551, JP-A-2-102257, etc. However, they are not sufficient in thermal resistance and mechanical properties.

The present invention provides inexpensive liquid crystal polyester resin compositions retaining the excellent thermal resistance, mechanical properties and thin wall properties inherent in the liquid crystal polyesters, and improved in molding processability and in weld strength and impact resistance of their molded articles.

DISCLOSURE OF INVENTION

The present inventors have intensively studied to solve these problems, thus completing the present invention.

That is, the present invention comprises:

(1) a liquid crystal polyester resin composition comprising 100 parts by weight of a composition comprising (A) 1 to 99% by weight of a liquid crystal polyester and (B) 99 to 1% by weight of an aromatic polycarbonate, and (C) 0.0001 to 3 parts by weight of a diamine;

(2) a liquid crystal polyester resin composition comprising 100 parts by weight of a composition comprising (A) 20 to 99% by weight of a liquid crystal polyester and (B) 80 to 1% by weight of a aromatic polycarbonate, and (C) 0.0001 to 0.2 part by weight of a diamine;

(3) a process for producing the liquid crystal resin composition described in (1) or (2) comprising melt kneading a liquid crystal polyester with an aromatic polycarbonate and a diamine;

(4) a process for producing the liquid crystal resin composition described in (1) or (2) comprising melt kneading a resin composition obtained by melt kneading a liquid crystal polyester with an aromatic polycarbonate and a diamine, with a liquid crystal polyester and an aromatic polycarbonate;

(5) a liquid crystal polyester resin composition comprising (A) a liquid crystal polyester, (B) an aromatic polycarbonate, (C) a diamine and (D) surface-untreated glass fibers having a number average fiber diameter of 5 to 25 μm, a number average fiber length of 30 to 1,000 μm, and a number average fiber length/number average fiber diameter ratio of 2 to 150, wherein the contents of components (A) and (B) are 35 to 99% by weight and 65 to 1% by weight, respectively, based on the total amount of components (A) and (B), and the contents of components (C) and (D) are 0.0001 to 3 parts by weight and 1 to 100 parts by weight, respectively, based on 100 parts by weight of the total amount of components (A) and (B);

(6) a process for producing the liquid crystal polyester resin composition described in (5) comprising melt kneading a liquid crystal polyester with an aromatic polycarbonate, a diamine and surface-untreated glass fibers having a number average fiber diameter of 5 to 25 μm, a number average fiber length of 30 to 1,000 μm, and a number average fiber length/number average fiber diameter ratio of 2 to 150; and (7) a process for producing the liquid crystal polyester resin composition described in (5) comprising melt kneading a resin composition obtained by melt kneading a liquid crystal polyester with an aromatic polycarbonate and a diamine, with a liquid crystal polyester, an aromatic polycarbonate and surface-untreated glass fibers having a number average fiber diameter of 5 to 25 μm, a number average fiber length of 30 to 1,000 μm, and a number average fiber length/number average fiber diameter ratio of 2 to 150.

The present invention will be described in more detail below.

The liquid crystal polyesters, component (A) of the liquid crystal polyester resin compositions of the present invention, are polyesters referred to as thermotropic liquid crystal polymers.

Examples thereof include:

(1) polyesters formed by combination of aromatic dicarboxylic acids, aromatic diols and aromatic hydroxycarboxylic acids;

(2) polyesters formed by combination of different kinds of aromatic hydroxycarboxylic acids;

(3) polyesters formed by combination of aromatic dicarboxylic acids and nucleus-substituted aromatic diols; and (4) reaction products between polyesters such as polyethylene terephthalate and aromatic hydroxycarboxylic acids, which form anisotropic molten materials at temperatures of 400° C. or less.

These aromatic dicarboxylic acids, aromatic diols, and aromatic hydroxycarboxylic acids may be replaced by their ester-forming derivatives in some cases. Examples of repeating structure units of the liquid crystal polyesters include, but are not limited to units represented by the following formulas:

Repeating Structure Units Derived from Aromatic Dicarboxylic Acids:

Repeating Structure Units Derived from Aromatic Diols:

-continued

Repeating Structure Units Derived from Aromatic Hydroxycarboxylic Acids:

(X': halogen, or aryl)

In view of balance among thermal resistance, mechanical characteristics and processability, the particularly preferred liquid crystal polyesters are crystalline polyesters containing the following repeating structure unit:

Specifically, they include combinations (I) to (V) of repeating structure units shown below:

(I)

(II)

(III)

(IV)

(V)

Liquid crystal polyesters (I), (II), (III) and (IV) are described, for example, in JP-B-47-47870 (the term "JP-B" as used herein means an "examined Japanese patent publication"), JP-B-63-3888, JP-B-63-3891 and JP-B-56-18016, respectively.

The aromatic polycarbonates, component (B) of the liquid crystal polyester resin compositions of the present invention, are aromatic polycarbonates containing the repeating structure units represented by general formula (VI) which are obtained by reacting dihydric phenols with carbonate precursors such as phosgene, haloformates and carbonic acid esters.

(A: a divalent aromatic group derived from a dihydric phenol)

The dihydric phenols employed herein are monocyclic or polycyclic aromatic compounds, which have two hydroxyl groups directly linked to the carbon atoms of each aromatic ring. Examples of these dihydric phenols include 2,2-bis(4-hydroxyphenyl)propane (bisphenol A), hydroquinone, resorcin, 2,2-bis(hydroxyphenyl)pentane, 2,4'-dihydroxydiphenyl-methane, bis(2-hydroxyphenyl)methane, bis-(4-hydroxyphenyl)-methane, bis(4-hydroxy-5-nitrophenyl)methane, 1,1-bis(4-hydroxyphenyl)ethane, 3,3-bis(4-hydroxyphenyl)pentane, 2,2-dihydroxydiphenyl, 2,6-dihydroxynaphthalene, bis(4-hydroxyphenyl)sulfone, 2,4'-dihydroxydiphenyl sulfone, 5-chloro-2,4'-dihydroxydiphenyl sulfone, bis(4-hydroxyphenyl)-diphenyl disulfone, 4,4-dihydroxydiphenyl ether, 4,4'-dihydroxy-3,3'-dichlorodiphenyl ether and 4,4'-dihydroxy-2,5-diethoxydiphenyl ether. Preferred exmples thereof are bisphenol A and its nucleus-substituted derivatives. These dihydric phenols are used alone or as mixtures.

The aromatic polycarbonates used in the resin compositions of the present invention are produced using the above-mentioned dihydric phenols as starting materials by known methods, namely, ester interchange methods, solution methods, interfacial polycondensation methods, etc. They have preferably a viscosity average molecular weight of 15,000 or more, and more preferably 25,000 or more. These specific polymerization methods are described, for example, in the section "Polycarbonates" of *Encyclopedia of Polymer Science and Technology*, volume 10, pp 710–764 (John Wiley & Sons, Inc., 1969). Further, copolymers as exemplified by polycarbonate-styrene block copolymers described in JP-B-48-25076 can also be employed as these polycarbonates.

The diamines, component (C) of the liquid crystal polyester resin compositions of the present invention, are represented by the following formula:

wherein $R_1$ represents a straight, branched-chain or cyclic alkylene group having 2 to 12 carbon atoms which may contain an oxygen or an ether bond; a monocyclic aromatic hydrocarbon group, or a polycyclic aromatic hydrocarbon group; $R_2$ and $R_3$ each represents a hydrogen atom, an alkyl group, a cycloalkyl group or an aromatic group.

Examples of the diamines include 1,2-diaminoethane, 1,3-diaminopropane, 1,4-diaminobutane, 1,6-diaminohexane, 1,8-diaminooctane, 1,10-diaminodecane, 1,12-diaminododecane, 1,4-diaminocyclohexane, bis(methylamino)hexane, bis(3-aminopropyl)ether, 1,2-bis(3-aminopropoxy)ethane, ethylaminoethylamine, methylaminopropylamine, N,N'-di-t-butylethylenediamine and bis(2-aminoethyl)benzene. Of these, it is preferred that either one or both of $R_2$ and $R_3$ are hydrogen atoms.

Examples thereof include 1,3-diaminopropane, 1,6-diaminohexane, 1,10-diaminodecane, 1,12-diaminododecane, methylaminopropylamine and bis(3-aminopropyl)ether.

In the liquid crystal polyester resin compositions of the present invention, the desired liquid crystal polyester resin compositions are obtained when the composition ratios of components (A), (B) and (C) are within the specified ranges. For the proportions of component (A) and component (B) in the present invention, the proportion of component (A) is 1 to 99% by weight, and the proportion of compound (B) is 99 to 1% by weight. The proportion of compound (A) is preferably 20 to 99% by weight and more preferably 20 to 80%, and that of compound (B) is preferably 80 to 1% by weight and more preferably 80 to 20% by weight.

When the proportion of component (A) is less than 1% by weight, molded articles composed of the compositions are insufficient in thermal resistance and mechanical properties, whereas a ratio exceeding 99% by weight results in insufficient dimensional stability of the compositions and deterioration in cost performance advantages.

In the liquid crystal polyester resin composition, the content of the diamine of component (C) is 0.0001 to 3 parts by weight, preferably 0.0001 to 0.2 part by weight, and more preferably 0.005 to 0.1 part by weight based on 100 parts by weight of the total amount of components (A) and (B). A diamine content of less than 0.0001 part by weight has little effect of improving thermal resistance and mechanical properties of the composition, and exceeding 3 parts by weight unfavorably lowers thermal resistance of the composition significantly.

Preferred morphology of the liquid crystal polyester resin composition of the present invention is the case that the liquid crystal polyester of component (A) mainly forms a continuous phase and the aromatic polycarbonate of component (B) mainly forms a dispersion phase.

In the case of such morphology, the compositions particularly have excellent thermal resistance, mechanical properties and thin wall properties.

In the liquid crystal polyester resin composition of the present invention, when the propotion of component (A) is 20 to 99% by weight, the proportion of component (B) is 80 to 1% by weight, and the content of component (C) of the diamine is 0.0001 to 0.2 part by weight based on 100 parts by weight of the total amount of components (A) and (B), such preferred morphology can be realized to make it possible to particularly improve thermal resistance and mechanical properties.

When the proportion of component (A) exceeds 99% by weight, the weld strength of the compositions significantly decreases and the effect of lowering the price thereof is little. When the proportion of component (A) is less than 20% by weight, most of component (A) in the composition fails to form a continuous phase to significantly lower thermal resistance, mechanical properties and thin wall properties thereof.

It is not always clear why the liquid crystal polyester resin compositions of the invention show excellent thermal resistance, mechanical properties, etc. However, polymers in which the liquid crystal polyesters are linked with the aromatic polycarbonates through the diamines are considered to bring about an improvement in compatibility between the liquid crystal polyesters and the aromatic polycarbonates.

The liquid crystal polyester resin compositions of the present invention can be further employed as compatibilizers for improving compatibility between liquid crystal polyesters and aromatic polycarbonates.

That is, a kneaded product obtained by melt kneading the liquid crystal polyester with the aromatic polycarbonate and the diamine is blended as the compatibilizer with the liquid crystal polyester and the aromatic polycarbonate, and further melt kneaded to obtain a liquid crystal polyester resin composition. The resulting liquid crystal polyester composition is more improved in compatibility between the components, and in thermal resistance and mechanical properties.

The liquid crystal polyester resin composition employed as the compatibilizer preferably comprises 100 parts by weight of a composition comprising (A) 1 to 99% by weight of the liquid crystal polyester and (B) 99 to 1% by weight of the aromatic polycarbonate, and (C) 0.01 to 1.0 parts by weight of the diamine.

When the amount ratios of the liquid crystal polyester, the aromatic polycarbonate and the diamine are without the above-mentioned range, the resin composition unfavorably results in lowered molding processability, mechanical properties, etc.

A process for producing the liquid crystal polyester resin compositions used as the compatibilizers is similar to that of the liquid crystal polyester resin compositions described below.

An example of use as the compatibilizer will be shown below. For example, 1 to 30 parts by weight of the above-mentioned liquid crystal polyester as the compatibilizer is added to 100 parts by weight of the total amount of the liquid crystal polyester and the aromatic polycarbonate in which the proportion of the liquid crystal polyester is 25 to 99% by weight and that of the aromatic polycarbonate is 75 to 1% by weight, and then melt kneaded.

In the liquid crystal polyester resin compositions of the invention, for the purpose of improving thermal resistance and mechanical properties, especially such as flexural modulus, tensile strength and impact strength, specified glass fibers can be blended as component (D).

The glass fibers of component (D) in the liquid crystal polyester resin compositions of the invention have a number average fiber diameter of 5 to 25 µm, and preferably 5 to 20 µm; and a number average fiber length of 30 to 1,000 µm, and preferably 30 to 300 µm.

When the number average fiber diameter or the number average fiber length is outside the respective ranges, the reinforcing effect of the glass fibers is reduced, unfavorably failing to obtain sufficient rigidity, thermal resistance and processability.

Further, the glass fibers are used which have a number average configuration ratio (hereinafter occasionally referred to as an aspect ratio) represented by (number average fiber length)/(number average fiber diameter) of the glass fibers, namely a ratio of the number average fiber length to the number average fiber diameter of the glass fibers, of 2 to 150, and preferably of 3 to 20. A number average aspect ratio outside this range unfavorably results in poor appearance of the molded articles composed of the composition and inferior molding processability.

As the glass fibers of component (D) in the present invention, surface-untreated glass fibers are used. It is not clear why the surface-untreated glass fibers bring about excellent properties. However, easy dispersion of the surface-untreated glass fibers into the liquid crystal polyester of component (A) is considered to cause the reinforcing effect on the resin composition to increase.

In the liquid crystal polyester resin compositions in which the specified glass fibers of component (D) of the invention are incorporated, when composition proportions of components (A), (B), (C) and (D) are within the specified ranges, the desired liquid crystal polyester resin compositions can be obtained. For the proportions of component (A) and component (B) in the present invention, the proportion of component (A) is 35 to 99% by weight, and the proportion of compound (B) is 65 to 1% by weight. The proportion of compound (A) is preferably 45 to 99% by weight, and that of compound (B) is preferably 55 to 1% by weight.

When the proportion of component (A) is less than 35% by weight, molded articles composed of the compositions are insufficient in thermal resistance and mechanical properties, whereas a ratio exceeding 99% by weight results in insufficient dimensional stability of the compositions and deterioration in cost performance advantages.

In the liquid crystal polyester resin compositions in which the specified glass fibers are incorporated, the content of the diamines of component (C) is 0.0001 to 3 parts by weight, and more preferably 0.0001 to 0.2 part by weight based on 100 parts by weight of the total amount of components (A) and (B). A diamine content of less than 0.0001 part by weight results in little effect of improving thermal resistance and mechanical properties of the compositions, whereas exceeding 3 parts by weight unfavorably significantly lowers thermal resistance of the compositions.

In this case, the amount of component (D) is 1 to 100 parts by weight, and preferably 2 to 80 parts by weight based on 100 parts by weight of the total amount of components (A) and (B). When the content of component (D) is less than 1 part by weight, the liquid crystal polyester resin compositions of the invention have little effect of improving mechanical strength and thermal resistance and also lower cost advantages, whereas exceeding 100 parts by weight lowers molding processability of the compositions, and also impairs appearance of injection molded articles.

Preferred morphology of the liquid crystal polyester resin composition of the present invention is that the liquid crystal polyester of component (A) mainly forms a continuous phase and the aromatic polycarbonate of component (B) mainly forms a dispersion phase.

In the case of such morphology, the compositions become particularly excellent in thermal resistance, mechanical properties, chemical resistance and thin wall properties.

Processes for producing the liquid crystal polyester resin compositions in the present invention can be carried out by known kneading methods. Examples thereof include methods in which the respective components are mixed with one another in the solution state, followed by evaporation of solvents or precipitation in solvents. From the commercial viewpoint, the method of kneading all components in the molten state is preferred. For the melt kneading, commonly used kneading apparatus such as single- and twin-screw extruders, and various types of kneaders can be employed. The twin-screw extruders are particularly preferred.

In melt kneading, the established cylinder temperature of the kneading apparatus are preferably 200° to 360° C., and more preferably 250° to 340° C.

In kneading, all the components may previously be uniformly mixed using an apparatus such as a tumbler and a Henschel mixer. Mixing may be omitted, and the components may be separately fed quantitatively into the kneading apparatus, if necessary.

For example, the liquid crystal polyester is previously blended with the aromatic polycarbonate in the solution state or melt kneaded therewith to obtain a mixture, and subsequently, the mixture can also be melt kneaded with the diamine to obtain the liquid crystal polyester resin composition.

Further, the aromatic polycarbonate, the liquid crystal polyester and the diamine are fed through a first inlet of the kneading machine, and the liquid crystal polyester or the aromatic polycarbonate is fed through a second inlet, whereby the liquid crystal polyester resin composition can also be obtained by a single kneading step.

Furthermore, the liquid crystal polyester, the aromatic polycarbonate and the diamine are melt kneaded, and the resulting kneaded product is blended with the liquid crystal polyester and the aromatic polycarbonate, followed by further melt kneading, whereby the liquid crystal polyester resin composition can also be obtained.

In the liquid crystal polyester resin compositions in which the glass fibers are incorporated, for example, the liquid crystal polyester is previously blended with the aromatic polycarbonate in the solution state or melt kneaded therewith to obtain a mixture, and subsequently, the mixture can also be melt kneaded with the diamine and the glass fibers to obtain the liquid crystal polyester resin composition.

Further, the aromatic polycarbonate, the liquid crystal polyester and the diamine are fed through a first inlet of the kneading machine, and the liquid crystal polyester or the aromatic polycarbonate and the glass fibers are fed through a second inlet, whereby the liquid crystal polyester resin composition can also be obtained by a single kneading step.

Furthermore, the liquid crystal polyester, the aromatic polycarbonate and the diamine are melt kneaded, and the resulting kneaded product is blended with the liquid crystal polyester, the aromatic polycarbonate and the glass fibers, followed by further melt kneading, whereby the liquid crystal polyester resin composition can also be obtained.

The resin compositions kneaded are molded by injection molding, extrusion molding or other various types of molding methods. However, molded articles can also be directly obtained, without previous kneading, by dry blending the components on injection molding or extrusion molding, and kneading during melt-processing operation to obtain the resin compositions of the present invention.

In the liquid crystal polyester resin compositions of the present invention, inorganic fillers are used, if desired. Examples of such inorganic fillers include calcium carbonate, talc, clay, silica, magnesium carbonate, barium sulfate, titanium oxide, alumina, plaster, carbon fibers, alumina fibers, silica-alumina fibers, aluminum borate whiskers, and potassium titanate fibers.

To the liquid crystal polyester resin compositions of the invention can be further added various types of additives such as organic fillers, antioxidants, stabilizers to heat, stabilizers to light, flame retardants, lubricants, antistatic agents, inorganic or organic colorants, anticorrosives, crosslinking agents, blowing agents, fluorescent brightening agents, surface smoothing agents, surface luster improvers, and mold releasing improvers such as fluororesins, during manufacturing steps or during processing steps thereafter, if desired.

BEST MODE FOR CARRYING OUT THE INVENTION

The present invention will be illustrated by means of examples below. However, these are for purpose of illustration only and are not construed to limit the scope of the invention. An "aromatic polycarbonate" may hereinafter occasionally be abbreviated as a "PC".

Figure 1:
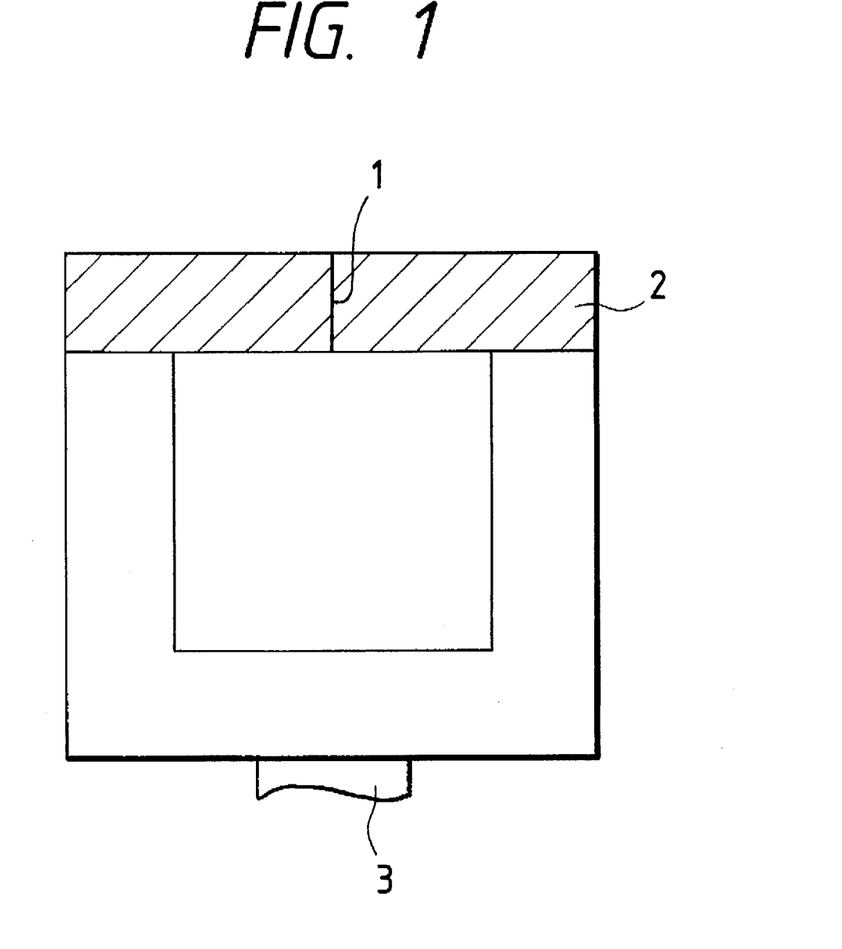
FIG. 1 is a plan view showing a test piece for measurement of weld strength.

(1) Methods for Measuring Properties:

Property measurements were conducted for molded articles prepared by injection molding of the compositions obtained in the following manner:

Weld Strength and Non-Weld Strength:

A test piece shown in FIG. 1 was molded from the composition of the present invention. This test piece had a thickness of 3 mm, an outer size of 64 mm, and an inner size of 38 mm. A shaded portion (64×13 mm) containing the weld line shown in FIG. 1 was cut out of the test piece, and subjected to measurement of the flexural strength at a distance between spans of 40 mm at a flexural rate of 2 mm/minute.

Further, a non-weld portion (64×13 mm) was cut of a test piece of the same shape, and the flexural strength was measured similarly.

Tensile Strength and Temperature of Deformation Under Load (hereinafter occasionally referred to as "TDUL"):

A tensile dumbbell of ASTM 4 and a test piece for TDUL measurement (127 mm length×12.7 mm width×6.4 mm thickness) were each molded, and the tensile strength and the TDUL (load: 18.6 kg) were measured according to ASTM D638 and ASTM D648, respectively.

Izod Impact Strength:

The izod impact strength of a test piece (6.4 mm in thickness) was determined without a notch at room temperature according to JISK 7110.

Flexural Strength and Flexural Modulus:

These were determined for a test piece (6.4 mm in thickness) according to ASTM D790.

Tensile Test of Thin-Walled Molded Article:

Injection molding of the composition was carried out using a dumbbell-shaped mold having a thickness of 0.5 mm, a length of 75 mm, and a neck part width of 5 mm, and the resulting dumbbell piece was used in the tensile test.

Morphology:

A molded article was cut at a cross section with a microtome and etched with carbon tetrachloride to dissolve out an aromatic polycarbonate portion, leaving a liquid crystal polycarbonate portion and glass fibers, and subjected to gold deposition to provide a sample for observation under an scanning electron microscope. Morphology thereof was classified as follows:

A: A liquid crystal polyester portion in the composition mainly forms a continuous phase and an aromatic polycarbonate portion in the composition mainly forms a dispersion phase.

B: An aromatic polycarbonate portion in the composition forms a continuous phase and a liquid crystal polyester portion in the composition mainly forms a dispersion phase.

Flow Temperature (hereinafter occasionally referred to as "F.T."):

The F.T. was determined with a CFT-500 type flow tester (capillary rheometer type) manufactured by Shimazu Corp.

The F.T. was defined as a temperature showing a melt viscosity of 48,000 poises, when a polymer molten by heating at a temperature-programmed rate of 4° C./minute was extruded from a nozzle having an inner diameter of 1 mm and a length of 10 mm under a load of 100 kg/cm$^2$.

(2) Liquid Crystal Polyesters of Component (A):

In a polymerization tank equipped with a comb-type stirrer blade were added 10.8 kg (60 moles) of p-acetoxybenzoic acid, 2.49 kg (15 moles) of terephthalic acid, 0.83 kg (5 moles) of isophthalic acid and 5.45 kg (20.2 moles) of 4,4'-diacetoxydiphenyl, and the mixture was heated with stirring in an atmosphere of nitrogen gas and polymerized at 330° C. for 1 hr. For this period of time, the mixture was polymerized with intensive stirring while removing by-produced acetic acid. Thereafter, the system was gradually cooled, and a polymer obtained was taken out of the system at 200° C. This polymer obtained was pulverized to particles having a size of less than 2.5 mm with a hammer mill manufactured by Hosokawa Micron Co., Ltd. The polymer was further treated in a rotary kiln in an atmosphere of nitrogen gas at 280° C. for 3 hours to obtain an particulate aromatic polyester comprising the following repeating structure units, the polyester having a flow temperature of 324° C. The liquid crystal polyester is hereinafter abbreviated as "A-1". This polymer showed optical anisotropy at a temperature of 340° C. or higher under pressure.

(3) Aromatic Polycarbonates of Component (B):

(i) As an aromatic polycarbonate, CALIBRE 300-4 (trade name) [MFR (300° C., 1.2 kg)=4] manufactured by Sumitomo Dow Co., Ltd. was employed. This aromatic polycarbonate is hereinafter abbreviated as "B-1".

(ii) As an aromatic polycarbonate, CALIBRE 200-6 (trade name) [MFR (300° C., 1.2 kg)=6] manufactured by Sumitomo Dow Co., Ltd. was employed. This aromatic polycarbonate is hereinafter abbreviated as "BB-1".

(iii) An aromatic polycarbonate used as component (B) is as follows:

b-1 (abbreviation): CALIBRE (registered trademark) 300-6 [MFR (300° C., load: 1.2 kg)=6].

(4) Liquid Crystal Polyester Resin Compositions as Compatibilizers:

(i) Seventy parts by weight of a polycarbonate, CALIBRE 300-6 (trade name) [MFR (300° C., 1.2 kg)=6] manufactured by Sumitomo Dow Co., Ltd., 30 parts by weight of A-1 and 0.5 part by weight of diaminododecane were collectively mixed with one another by the use of a Henschel mixer, and then melt kneaded at an established cylinder temperature of 320° C. using a PCM-30 type twin-screw extruder manufactured by Ikegai Corp. Gas chromatography (GC) measurement was conducted for the resulting polymer, and it was ascertained that no diaminododecane was left in the polymer. The total nitrogen content of the polymer was found to be 0.07% by weight by atomic absorption spectrometry.

This compatibilizer is hereinafter abbreviated as "M-1".

(ii) Fifty Parts by weight of a polycarbonate, CALIBRE 300-6 (trade name) manufactured by Sumitomo Dow Co., Ltd., 50 parts by weight of A-1 and 0.3 part by weight of hexamethylenediamine were mixed with one another together with a stabilizer by the use of a Henschel mixer, and then melt kneaded at an established cylinder temperature of 305° C. using a PCM-30 type twin-screw extruder manufactured by Ikegai Corp. while removing volatile materials.

Gas chromatography (GC) measurement was conducted for the resulting polymer, and it was ascertained that said diamine was not left in the polymer.

The total nitrogen content of the polymer was found to be 0.03% by weight by atomic absorption spectrometry.

This compatibilizer is hereinafter abbreviated as "M-2".

(5) Diamines of Component (C):

The diamines and their abbreviation employed in Examples are as follows:

| Abbreviation | |
|---|---|
| C-1 | 1,12-Diaminododecane |
| C-2 | 1,6-Diaminohexane |

(6) Glass Fibers of Component (D):

The glass fibers used as component (D) are as follows:

D-1 (abbreviation): EFH75-01 (trade name) manufactured by Central Glass Co., Ltd.; number average fiber diameter: 13 µm; number average fiber length: 50 µm; aspect ratio: 3.8; surface-untreated.

D-2 (abbreviation): REV8 (trade name) manufactured by Nippon Sheet Glass Co., Ltd.; number average fiber diameter: 13 µm; number average fiber length: 35 µm; aspect ratio: 2.7; treated with aminosilane.

D-3 (abbreviation), RES03-TP75 (trade name) manufactured by Nippon Sheet Glass Co., Ltd.; number average fiber diameter: 10 µm; number average fiber length: 3 mm; aspect ratio: 300; treated with a silane-based coupling agent.

EXAMPLES 1 TO 2 AND COMPARATIVE EXAMPLES 1 TO 4

The respective components of each composition shown in Table 1 were collectively mixed with one another together with a stabilizer using a Henschel mixer, and then, the mixture was melt kneaded at a cylinder temperature of 280° to 325° C. at a revolution of 320 rpm using a twin-screw extruder TEX-30 manufactured by The Japan Steel Works, Ltd. while removing volatile materials.

The measurement of the properties was carried out about the molded articles prepared by the injection molding of the compositions obtained at a molding temperature of 200° to 330° C. and at a mold temperature of 70° to 130° C. using an IS150E-V type injection molding machine manufactured by Toshiba Machine Co., Ltd.

The properties of the compositions obtained are shown in Table 1. The whiteness of the molded articles of Examples 1 and 2 was more improved than that of the molded article of Comparative Example 3 (100% liquid crystal polyester).

EXAMPLE 3 AND COMPARATIVE EXAMPLE 5

The respective components of each composition shown in Table 2 were fed together with a stabilizer through first and second feed inlets of a twin-screw extruder TEX-30 manufactured by The Japan Steel Works, Ltd., respectively, and melt kneaded at a cylinder temperature of 330° C. at a revolution of 250 rpm. The measurement of the properties was conducted about the molded articles prepared by injection molding under the same conditions as mentioned above. The properties of the compositions obtained are shown in Table 2. The whiteness of the molded article of Example 3 was more improved than that of the molded article of Comparable Example 5 (100% liquid crystal polyester).

The above-mentioned results show that the liquid crystal polyester resin compositions of the present invention are excellent in thermal resistance, melt processability and mechanical properties, particularly in weld strength and impact resistance, and also good in appearance of the molded articles. Moreover, they are inexpensive resin compositions because the aromatic polycarbonates are incorporated therein.

EXAMPLES 4 TO 7 AND COMPARATIVE EXAMPLES 6 TO 10

The respective components of each composition shown in Table 3 [the numerals in the upper line show the compositions (part by weight) of A-1, BB-1 and compatibilizers, and the numerals in the lower line show the compositions (part by weight) converted therefrom to components A, B and C by calculation] were collectively mixed with one another together with a stabilizer using a Henschel mixer, and then, the mixture was melt kneaded at an established cylinder temperature of 280° to 340° C. using a twin-screw extruder TEX-30 manufactured by The Japan Steel Works, Ltd.

The measurement of the properties was carried out about the molded articles prepared by injection molding of the resulting compositions at a mold temperature of 70° to 130° C., at a molding temperatures of 260° C. in Comparative Example 9 and of 250° to 350° C. in the other Examples, using an IS150E-V type injection molding machine manufactured by Toshiba Machine Co., Ltd.

The properties of the compositions obtained are shown in Table 3.

Figure 2:
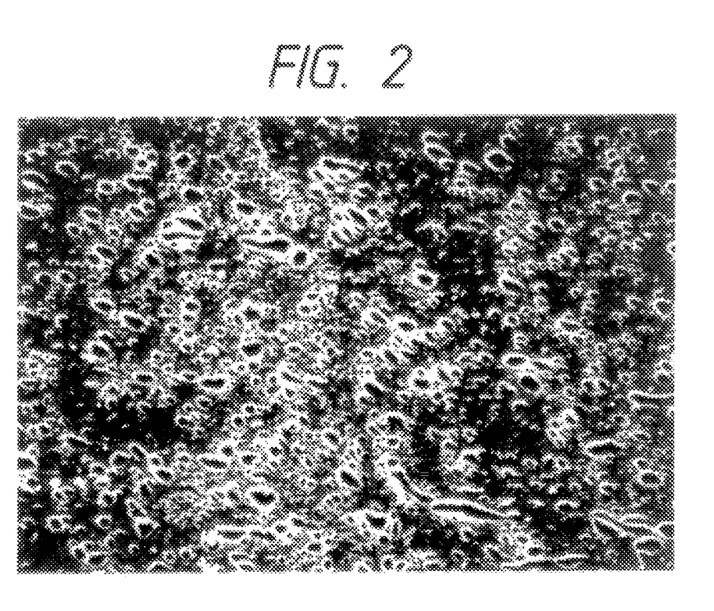
FIG. 2 is a photograph through a scanning electron microscope showing a phase state of a liquid crystal polyester and an aromatic polycarbonate in an injection molded article formed of the liquid crystal polyester resin composition prepared in Example 4.
Figure 3:
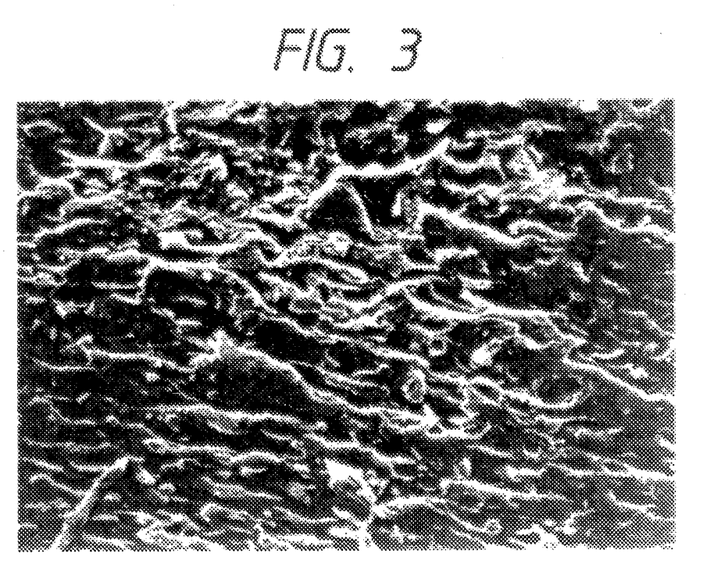
FIG. 3 is a photograph through a scanning electron microscope showing a phase state of a liquid crystal polyester and an aromatic polycarbonate in an injection molded article formed of the liquid crystal polyester resin composition prepared in Example 6.
Figure 4:
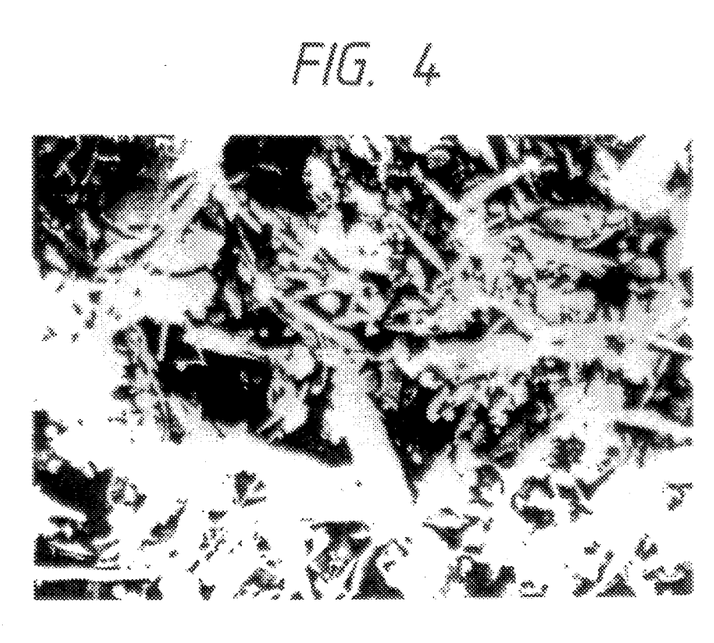
FIG. 4 is a photograph through a scanning electron microscope showing a phase states of a liquid crystal polyester and an aromatic polycarbonate in an injection molded article formed of the liquid crystal polyester resin composition prepared in Comparative Example 8.

The photographs of the respective molded articles formed of the compositions in Examples 4 and 6 and Comparative Example 8 through a scanning electron microscope are shown in FIGS. 2 to 4. They show that the aromatic polyester portions form the continuous phases in the compositions of Examples 4 and 6, and form the dispersion phase in the composition of Comparative Example 8.

The above-mentioned results show that the liquid crystal resin compositions of the present invention are excellent in thermal resistance, melt processability and mechanical properties, particularly in weld strength, impact resistance and thin wall properties, and further they are inexpensive resin compositions because the aromatic polycarbonates are incorporated therein.

EXAMPLES 8 TO 10 AND COMPARATIVE EXAMPLES 11 TO 14

The respective components of each composition shown in Table 4 were mixed with one another together with a stabilizer by the use of a Henschel mixer, and then, the mixture was melt kneaded at an established cylinder temperature of 342° C. using a PCM-30 type twin-screw extruder manufactured by Ikegai Corp. while removing volatile materials. The measurement of the properties was conducted about the molded articles formed by injection molding of the compositions at a molding temperature of 342° C. at a mold temperature of 120° C. using a PS40E5ASE type injection molding machine manufactured by Nissei Jusi Kogyo Co., Ltd.

The results are shown in Table 4.

The results reveal that the liquid crystal polyester resin compositions of the present invention are excellent in thermal resistance and mechanical properties, and further they are inexpensive resin compositions.

TABLE 1

| | Composition (part by weight) | | |
|---|---|---|---|
| | Component (A) Liquid Crystal Polyester A-1 | Component (B) PC B-1 | Component (C) Diamine |
| Example No. | | | |
| 1 | 70 | 30 | C-1 0.1 |
| 2 | 10 | 90 | C-2 0.05 |
| Comparative Example No. | | | |
| 1 | 70 | 30 | 0 |
| 2 | 10 | 90 | 0 |
| 3 | 100 | 0 | 0 |
| 4 | 0 | 100 | 0 |

TABLE 1-continued

| | | | Properties | | | | |
|---|---|---|---|---|---|---|---|
| | | | Izod | Tensile Test | | Flexural | Weld Strength |
| | | | Impact | Tensile | | | |
| | F.T. (°C.) | TDUL (°C.) | Strength (kg · cm/cm) | Strength (kg/cm²) | Elongation (%) | Modulus (kg/cm²) | Weld (kg/cm²) | Non-Weld (kg/cm²) |

| Example No. | F.T. (°C.) | TDUL (°C.) | Impact Strength (kg·cm/cm) | Tensile Strength (kg/cm²) | Elongation (%) | Flexural Modulus (kg/cm²) | Weld (kg/cm²) | Non-Weld (kg/cm²) |
|---|---|---|---|---|---|---|---|---|
| 1 | 282 | 229 | 53 | 1,410 | 7.9 | 59,000 | 290 | 630 |
| 2 | | 159 | no break | 980 | 7.5 | 34,000 | — | — |
| Comparative Example No. | | | | | | | | |
| 1 | 285 | 222 | 41 | 1,230 | 6.1 | 52,000 | 210 | 610 |
| 2 | | 148 | 62 | 770 | 5.6 | 26,000 | — | — |
| 3 | 295 | 242 | 51 | 1,570 | 5.7 | 69,000 | 200 | 790 |
| 4 | | 139 | no break | 710 | 7.0 | 24,000 | — | — |

TABLE 2

| | Composition (Parts by Weight) | | | | |
|---|---|---|---|---|---|
| | Fed through First Feed Inlet | | | Fed through Second Feed Inlet | |
| | Component (A) Liquid Crystal Polyester A-1 | Component (B) PC B-1 | Component (C) Diamine | Component (A) Liquid Crystal Polyester A-1 | Component (B) PC B-1 |
| Example 3 | 25 | 25 | C-1 0.3 | 30 | 20 |
| Comparative Example 5 | 25 | 25 | 0 | 30 | 20 |

| | Properties | | | | | |
|---|---|---|---|---|---|---|
| | | | Izod Impact | Tensile | Flexural | Weld Strength |
| | F.T. (°C.) | TDUL (°C.) | Strength (kg cm/cm) | Strength (kg/cm²) | Strength (kg/cm²) | Weld (kg/cm²) | Non-Weld (kg/cm²) |
| Example 3 | 271 | 217 | 52 | 1,120 | 47,000 | 250 | 620 |
| Comparative Example 5 | 275 | 209 | 31 | 920 | 41,000 | 190 | 580 |

TABLE 3

| | Composition (Parts by Weight) | | | | Tensile | Flexural |
|---|---|---|---|---|---|---|
| | A-1 Component A | B-1 Component B | Compatibilizer Component C | TDUL (°C.) | Strength (kg/cm²) | Modulus (kg/cm²) |
| Example No. | | | | | | |
| 4 | 70 (70) | 30 (30) | M-1 5 (0.024) | 234 | 1,600 | 61,000 |
| 5 | 70 (70) | 30 (30) | M-1 10 (0.045) | 232 | 1,750 | 54,000 |
| 6 | 30 (30) | 70 (70) | M-1 5 (0.024) | 151 | 1,420 | 33,000 |
| 7 | 50 (50) | 50 (50) | M-2 4 (0.012) | 168 | 1,510 | 42,000 |
| Comparative Example No. | | | | | | |
| 6 | 70 (70) | 30 (30) | 0 (0) | 223 | 1,210 | 49,000 |
| 7 | 30 | 70 | 0 | 150 | 1,210 | 31,000 |

TABLE 3-continued

| | | | | | | |
|---|---|---|---|---|---|---|
| 8 | (30) 10 | (70) 90 | (0) 0 | 137 | 780 | 24,000 |
| 9 | (10) 0 | (90) 100 | (0) 0 | 135 | 690 | 21,000 |
| 10 | (0) 100 (100) | (100) 0 (0) | (0) 0 (0) | 242 | 1,790 | 69,000 |

| | 0.5 t Thin Wall Properties | | | | Izod | |
|---|---|---|---|---|---|---|
| | Tensile | Tensile | Weld Strength | | Impact | |
| | Strength (kg/cm$^2$) | Elasticity (kg/cm$^2$) | Weld (kg/cm$^2$) | Non-Weld (kg/cm$^2$) | Strength (kg cm/cm) | Morphology |
| Example No. | | | | | | |
| 4 | 1,440 | 86,000 | 290 | 860 | 65 | A |
| 5 | 1,730 | 107,000 | 360 | 850 | no break | A |
| 6 | 1,150 | 57,000 | 560 | 890 | 31 | A |
| 7 | 1,360 | 77,000 | 410 | 860 | 37 | A |
| Comparative Example No. | | | | | | |
| 6 | 1,200 | 81,000 | 260 | 700 | 41 | A |
| 7 | 950 | 50,000 | 510 | 800 | 27 | A |
| 8 | 660 | 28,000 | 290 | 500 | 70 | B |
| 9 | — | — | — | — | no break | — |
| 10 | 2,870 | 143,000 | 190 | 870 | 53 | — |

TABLE 4

| | Composition (Parts by Weight) | | | |
|---|---|---|---|---|
| | Component A | Component B | Component C | Component D |
| Example No. | | | | |
| 8 | A-1 68 | b-1 32 | C-1 0.004 | D-1 44 |
| 9 | A-1 81 | b-1 19 | C-2 0.0009 | D-1 67 |
| 10 | A-1 51 | b-1 49 | C-2 0.0009 | D-1 67 |
| Comparative Example No. | | | | |
| 11 | A-1 68 | b-1 32 | C-1 0.004 | 0 |
| 12 | A-1 68 | b-1 32 | C-1 0.004 | D-2 44 |
| 13 | A-1 68 | b-1 32 | C-1 0.004 | D-3 44 |
| 14 | A-1 68 | b-1 32 | 0 | 0 |

| | Properties | | | | |
|---|---|---|---|---|---|
| | TDUL (°C.) | Flexural Elasticity (kg/cm$^2$) | Tensile Strength (kg/cm$^2$) | Izod Impact Strength (kg cm/cm) | Morphology |
| Example No. | | | | | |
| 8 | 271 | 94,000 | 1,590 | 52 | A |
| 9 | 287 | 124,000 | 1,670 | 61 | A |
| 10 | 258 | 96,000 | 1,390 | 44 | A |
| Comparative Example No. | | | | | |
| 11 | 240 | 52,000 | 1,300 | 40 | A |
| 12 | 235 | 71,000 | 1,100 | 37 | A |
| 13 | 233 | 77,000 | 1,370 | 45 | A |
| 14 | 231 | 46,000 | 1,180 | 26 | A |

INDUSTRIAL APPLICABILITY

The liquid crystal polyester resin compositions of the present invention retain excellent thermal resistance and mechanical properties inherent in the liquid crystal polyesters, are improved in molding processability, weld strength, impact resistance and thin wall properties of the molded articles, and are inexpensive. Making use of these characteristics, the resin compositions are used for molded articles, sheets, tubes, films, fibers, laminated products, coating materials and the like, by injection molding or extrusion molding.

We claim:

1. A liquid crystal polyester resin composition comprising 100 parts by weight of a composition comprising (A) 1 to 99% by weight of a liquid crystal polyester and (B) 99 to 1% by weight of an aromatic polycarbonate, and (C) 0.0001 to 3 parts by weight of a diamine.

2. A liquid crystal polyester resin composition comprising 100 parts by weight of a composition comprising (A) 20 to 99% by weight of a liquid crystal polyester and (B) 80 to 1% by weight of an aromatic polycarbonate, and (C) 0.0001 to 0.2 part by weight of a diamine.

3. A process for producing the liquid crystal resin composition as claimed in claim 1 or 2 comprising melt kneading a liquid crystal polyester with an aromatic polycarbonate and a diamine.

4. A process for producing the liquid crystal resin composition as claimed in claim 1 or 2 comprising melt kneading a resin composition obtained by melt kneading a liquid crystal polyester with an aromatic polycarbonate and a diamine, with a liquid crystal polyester and an aromatic polycarbonate.

5. A liquid crystal polyester resin composition comprising (A) a liquid crystal polyester, (B) an aromatic polycarbonate, (C) a diamine and (D) surface-untreated glass fibers having a number average fiber diameter of 5 to 25 μm, a number average fiber length of 30 to 1,000 μm, and a number average fiber length/number average fiber diameter ratio of 2 to 150, wherein the contents of components (A) and (B) are 35 to 99% by weight and 65 to 1% by weight, respectively, based on the total amount of components (A) and (B), and the contents of components (C) and (D) are 0.0001 to 3 parts by weight and 1 to 100 parts by weight, respectively, based on 100 parts by weight of the total amount of components (A) and (B).

6. A process for producing the liquid crystal polyester resin composition as claimed in claim 5 comprising melt kneading a liquid crystal polyester with an aromatic polycarbonate, a diamine and surface-untreated glass fibers having a number average fiber diameter of 5 to 25 μm, a number average fiber length of 30 to 1,000 μm, and a number average fiber length/number average fiber diameter ratio of 2 to 150.

7. A process for producing the liquid crystal polyester resin composition as claimed in claim 5, comprising the step of melt kneading (i) a resin composition, wherein the resin composition is prepared by melt kneading a liquid crystal polyester with an aromatic polycarbonate and a diamine, with (ii) a liquid crystal polyester, (iii) an aromatic polycarbonate and (iv) surface-untreated glass fibers having a number average fiber diameter of 5 to 25 μm, a number average fiber length of 30 to 1,000 μm, and a number average fiber length/number average fiber diameter ratio of 2 to 150.

8. The liquid crystal polyester resin composition as claimed in claim 1 or 2, wherein the liquid crystal polyester (A) is

(i) a polyester formed by the combination of aromatic dicarboxylic acids, aromatic diols and aromatic hydroxycarboxylic acids, (ii) a polyester formed by the combination of different aromatic hydroxycarboxylic acids, (iii) a polyester formed by the combination of aromatic dicarboxylic acids and nucleus-substituted aromatic diols, or (iv) a polyester formed from the reaction product between polyesters, which form anisotropic molten materials at temperatures of 400° C. or less.

9. The liquid crystal polyester resin composition as claimed in claim 1 or 2, wherein the diamine (C) is represented by the following formula:

wherein $R_1$ represents a straight, branched-chain or cyclic alkylene group having 2 to 12 carbon atoms which may contain an oxygen or an ether bond; and $R_2$ and $R_3$ each represents a hydrogen atom, an alkyl group or a cycloalkyl group.